(12) United States Patent
Brasel et al.

(10) Patent No.: US 8,939,016 B2
(45) Date of Patent: Jan. 27, 2015

(54) FLOW SENTINEL

(76) Inventors: Roger Brasel, Keauhou, HI (US); Nancy Brasel, Keauhou, HI (US); Stephen Samuels, San Jose, CA (US)

( * ) Notice: Subject to any disclaimer, the term of this patent is extended or adjusted under 35 U.S.C. 154(b) by 308 days.

(21) Appl. No.: 13/325,217

(22) Filed: Dec. 14, 2011

(65) Prior Publication Data
US 2012/0144898 A1    Jun. 14, 2012

Related U.S. Application Data

(60) Provisional application No. 61/422,732, filed on Dec. 14, 2010.

(51) Int. Cl.
| | |
|---|---|
| *G01M 3/28* | (2006.01) |
| *G08B 17/00* | (2006.01) |
| *G01F 15/075* | (2006.01) |
| *B67D 1/12* | (2006.01) |
| *G05D 7/00* | (2006.01) |
| *G01F 15/14* | (2006.01) |
| *G01F 1/76* | (2006.01) |
| *G01F 15/06* | (2006.01) |

(52) U.S. Cl.
CPC .............. *G01F 15/0755* (2013.01); *B67D 1/12* (2013.01); *G01M 3/2807* (2013.01); *G05D 7/00* (2013.01); *G01F 15/14* (2013.01); *G01F 1/76* (2013.01); *G01F 15/063* (2013.01)
USPC ........................ 73/40.5 R; 340/605

(58) Field of Classification Search
USPC ......... 73/861.77, 861.78, 239, 40.5; 340/605, 340/870.02, 870.07
See application file for complete search history.

(56) References Cited

U.S. PATENT DOCUMENTS

| | | | |
|---|---|---|---|
| 2,109,317 A | 2/1938 | Johnson | |
| 4,881,177 A * | 11/1989 | McClean et al. | 700/258 |
| 5,287,884 A | 2/1994 | Cohen | |
| 5,655,749 A | 8/1997 | Mauerhofer | |
| 5,771,920 A | 6/1998 | Jewett et al. | |
| 6,216,727 B1 | 4/2001 | Genova et al. | |
| 6,317,051 B1 | 11/2001 | Cohen | |
| 6,374,846 B1 | 4/2002 | DeSmet | |
| 6,433,875 B1 * | 8/2002 | Kovac | 356/498 |
| 6,543,479 B2 | 4/2003 | Coffey et al. | |
| 6,611,769 B2 | 8/2003 | Olson | |
| 6,708,722 B1 | 3/2004 | Goodenough | |
| 6,837,883 B2 * | 1/2005 | Moll et al. | 606/1 |
| 7,299,814 B2 | 11/2007 | Fenton | |
| 7,308,824 B2 | 12/2007 | Trescott, Jr. et al. | |
| 7,380,568 B2 | 6/2008 | Tiwet | |
| 7,412,882 B2 | 8/2008 | Lazar et al. | |
| 7,742,883 B2 | 6/2010 | Dayton et al. | |
| 7,847,707 B2 | 12/2010 | Bakken et al. | |
| 8,042,425 B2 * | 10/2011 | Dujardin | 74/490.09 |
| 8,243,280 B2 * | 8/2012 | Dubois et al. | 356/502 |
| 2003/0210151 A1 | 11/2003 | Kimberlain et al. | |
| 2006/0137090 A1 | 6/2006 | Jeffries et al. | |
| 2009/0066524 A1 | 3/2009 | Yukawa et al. | |
| 2010/0204839 A1 | 8/2010 | Behm et al. | |

* cited by examiner

*Primary Examiner* — J M Saint Surin
(74) *Attorney, Agent, or Firm* — Ditthavong & Steiner, P.C.

(57) ABSTRACT

A flow sentinel for improved remote monitoring and control of the flow in a water line serving a residential or commercial structure comprises: (1) a watertight case having a first side and a second side oppositely placed; (2) a water inlet positioned in the first side of the watertight case; (3) a water outlet positioned in the second side of the watertight case; (4) a water flow meter in operable contact with the water inlet and the water outlet; (5) at least one means for display and/or remote transmission of the flow rate of the water; (6) an alarm; (7) means for shutting off the flow in a water line; and (8) means for powering the water flow meter.

19 Claims, 12 Drawing Sheets

FLOW SENTINEL

CROSS-REFERENCES

This application claims priority from U.S. Provisional Patent Application Ser. No. 61/422,732, by R. Brasel et al., filed on Dec. 14, 2010 and entitled "Flow Sentinel," the contents of which are incorporated herein in their entirety by this reference.

FIELD OF THE INVENTION

This invention is directed to a flow sentinel for monitoring, and, if necessary, shutting off, water flow in water lines and providing an indication of the status of the water lines.

BACKGROUND OF THE INVENTION

Water lines in residential, commercial, and industrial properties are ubiquitous, but, in the event of a leak or other damage to them, they can cause serious problems. Water line leakages are a major contributor to water damage to properties and can generate mold and mildew, leading to health concerns. Even if a leak does not cause visible water damage or mold growth, it can greatly increase water consumption and cause water waste. Because of drought in many areas, such as Southern California and Hawaii, water rates have been increased considerably in many jurisdictions and severe penalties can be levied on property owners who waste water as the result of an undetected leak.

The issue of potential water line leakage is particularly important for properties that are not continually occupied, such as second homes, vacation homes, or vacant commercial properties. If not noticed, a water line leakage in such a property can go undetected for weeks or months, causing severe damage. In a multi-unit building such as an apartment building, a condominium, or an office building divided into suites, such a water leak can also cause damage in adjoining units.

Various devices that provide some sort of monitoring or control over flow in water lines have been described, for example, in U.S. Pat. No. 2,109,317 to Johnson; U.S. Pat. No. 5,287,884 to Cohen; U.S. Pat. No. 5,655,749 to Mauerhofer; U.S. Pat. No. 6,317,051 to Cohen; U.S. Pat. No. 6,543,479 to Coffey et al.; U.S. Pat. No. 6,708,722 to Goodenough; U.S. Pat. No. 7,299,814 to Fenton; U.S. Pat. No. 7,380,568 to Tiwet; U.S. Pat. No. 7,742,883 to Dayton et al.; United States Published Patent Application No. 2003/0210151 by Kimberlain et al.; United States Published Patent Application No. 2006/0137090 by Jeffries et al.; United States Published Patent Application No. 2009/0066524 by Yukawa et al.; and United States Published Patent Application No. 2010/0204839 by Behm et al. However, the devices in these patents or patent applications do not offer the required degree of flexibility, control, and remote communication capability to meet the needs described above.

Therefore, there is a need to develop an inexpensive and easily installed flow sentinel that can monitor water flow in water lines. Preferably, such a flow sentinel can determine if an excessive flow condition is present, shut off the flow if necessary, and remotely notify the property owner, tenant, or manager, as well as the water supply agency. Preferably such a flow sentinel can also display the current flow rate and the condition of the water line and provide an audible or visible indication of an alarm condition.

SUMMARY OF THE INVENTION

A flow sentinel according to the present invention can monitor water flow in water lines. Such a flow sentinel can determine the existence of an excessive flow condition such as that caused by a leak, and can activate a flow shutoff system. In some embodiments, the flow sentinel can remotely notify the property owner, tenant, or manager, as well as the water supply agency. In some embodiments, the flow sentinel can display the current flow rate and the condition of the water line; it can also provide an audible or visible indication of the existence of an alarm condition.

One embodiment of a flow sentinel according to the present invention comprises:

(1) a watertight case having a first side and a second side oppositely placed;

(2) a water inlet positioned in the first side of the watertight case, the water inlet being adapted for connection to a water line;

(3) a water outlet positioned in the second side of the watertight case, the water outlet being adapted for connection to a water line;

(4) a water flow meter in operable contact with the water inlet and the water outlet so that water flows into the water inlet, flows through the flow meter, and flows out the water outlet, the water flow meter providing a digital readout of the flow rate of the water;

(5) at least one means for display and/or remote transmission of the flow rate of the water;

(6) an alarm to provide an indication of a water leak or other abnormal or unsafe operating condition;

(7) means for shutting off the flow in a water line to which the flow sentinel is connected; and (8) means for powering the water flow meter, the means for display and/or remote transmission of the flow rate of the water, the alarm, and the means for shutting off the flow in the water line to which the flow sentinel is connected.

The water flow meter can be a mechanical water flow meter, a magnetic water flow meter, or an ultrasonic water flow meter. The water flow meter can also measure pressure in the water line.

The means for display and remote transmission of the flow rate of the water can be a digital display. Remote transmission can occur via a wired connection or a wireless connection.

The alarm can provide an audible or a visible indication of a leak or other abnormal or unsafe operating condition.

The means for shutting off the flow in a water line to which the flow sentinel is connected can be a solenoid that is energized when the flow sentinel detects an abnormally high rate of flow in the water line. However, other devices can be used to effect a shutoff when a current is applied and the current is triggered by an abnormally high rate of flow in the water line.

The flow sentinel can be powered by line voltage, line voltage reduced to a low voltage by a stepdown transformer, or battery power. If the flow sentinel is powered by line voltage or line voltage reduced to a low voltage by a stepdown transformer, then the flow sentinel can also have backup battery power.

The flow sentinel can further comprise a dataport for a wired internet connection.

The flow sentinel can also further comprise a turbine placed between the water inlet and the water outlet, wherein the flow sentinel derives at least part of the power to run it from the turbine.

In another alternative, the flow sentinel can also further comprise a signal transceiver to provide dial-in capability to provide a user control of the flow sentinel from an internet-enabled device. The signal transceiver can further comprise a memory unit to store data.

In yet another alternative, the flow sentinel can verify water meter readings and remotely send water meter readings to a water service provider.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE INVENTION

Figure 1:
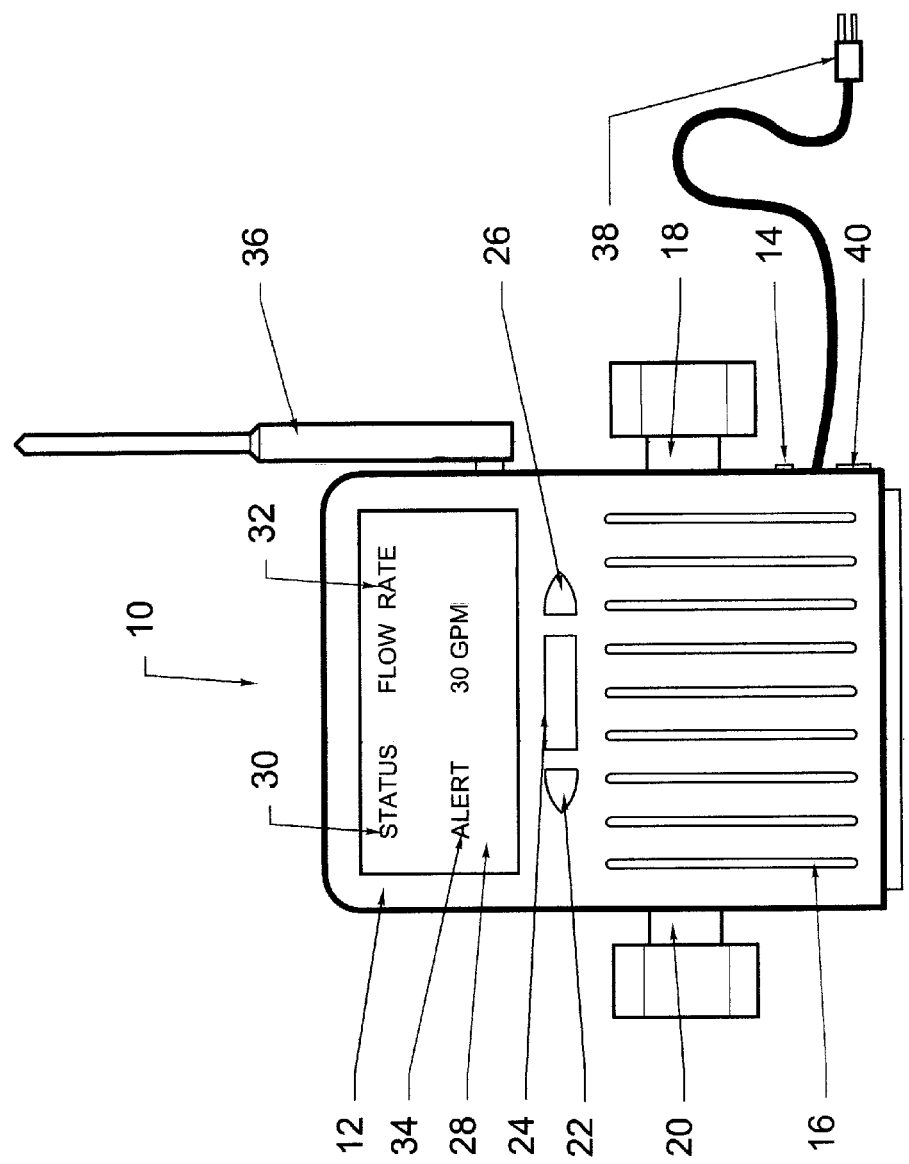
FIG. 1 is a perspective view from the front of a flow sentinel according to the present invention employing power from line voltage.

One embodiment of a flow sentinel comprises:

(1) a watertight case having a first side and a second side oppositely placed;

(2) a water inlet positioned in the first side of the watertight case, the water inlet being adapted for connection to a water line;

(3) a water outlet positioned in the second side of the watertight case, the water outlet being adapted for connection to a water line;

(4) a water flow meter in operable contact with the water inlet and the water outlet so that water flows into the water inlet, flows through the flow meter, and flows out the water outlet, the water flow meter providing a digital readout of the flow rate of the water;

(5) at least one means for display and/or remote transmission of the flow rate of the water;

(6) an alarm to provide an indication of a water leak or other abnormal or unsafe operating condition;

(7) means for shutting off the flow in a water line to which the flow sentinel is connected; and (8) means for powering the water flow meter, the means for display and/or remote transmission of the flow rate of the water, the alarm, and the means for shutting off the flow in the water line to which the flow sentinel is connected.

The watertight case can be, for example, of generally box-like or cuboidal shape; it can also have slanting sides or other configurations as needed to fit in a narrow space adjacent to a water line.

The water flow meter is a conventional flow meter such as is known in the art. The water flow meter can be a mechanical flow meter such as an oscillating piston water flow meter, a nutating disc water flow meter, a single jet velocity-type water flow meter, a multiple-jet velocity-type water flow meter, a turbine velocity-type water flow meter, or a propeller velocity-type water flow meter. Alternatively, the water flow meter can be a magnetic water flow meter, or an ultrasonic water flow meter. If the water flow meter is a mechanical water flow meter, a transducer is required to convert the mechanical output to a digital electrical signal. Typically, the water flow meter is a magnetic water flow meter or an ultrasonic water flow meter that produces a digital electrical signal. Such water flow meters producing a digital electrical signal are well known in the art.

In one alternative, the water flow meter can also measure water pressure in the water line.

A variety of means for display and/or remote transmission of the flow rate of the water, as well as the water pressure, if measured, are known in the art and can be employed. For example, a digital display can be mounted on the surface of the case that displays the flow rate in any commonly used units such as gallons per minute (GPM) or liters per minute (LPM). The digital display can also indicate the status of the water line and provide a visual indication of an alarm condition, such as by the use of a contrasting color (e.g., red for the display of the alarm condition versus blue or green for the flow rate). Remote transmission of the flow rate, the pressure, or of the existence of an alarm condition can be achieved by conventional wireless or wired connections, such as are known in the art, and can be used to contact the user via a cell phone, a smart phone, a laptop, or other communications device. Remote transmission of the flow rate and pressure, if measured, can also be performed to the water service provider such as a utility company or municipal, county, or water district water service provider. This transmission can be via an antenna mounted on the outside of the flow sentinel as is commonly employed with wireless devices such as routers. The display can be controlled, as is known in the art, by buttons or a touch panel mounted on the outside of the flow sentinel. For example, and not by way of limitation, a control button can be used to activate the digital display with automatic fadeout of the digital display after a preset time interval. Additional control buttons can be used, for example, and again not by way of limitation, to toggle the digital display between flow rate and pressure, to toggle the digital display between gallons per minute and liters per minute, to adjust the brightness of the display, or for other purposes.

The alarm can be a visual or audible indication triggered by a flow rate exceeding a preset value that would be indicative of a leak. The preset value can be an instantaneous flow rate value or a flow rate value that is integrated over a defined period of time to result in value of total water flow over a period such as 15 minutes, 30 minutes, or 1 hour. The audible indication can be a sound such as a buzzer, a bell, a beep, or an siren. In one alternative, different audible indications can be used to distinguish the degree of excess flow rate detected. In another alternative, the volume of the audible indication can be varied depending on the degree of excess flow rate detected; the greater the excess flow rate, the louder the audible indication detected. Hardwired computerized sound generators are well known in the art and are common, for example, in alarm clocks. In addition, the device typically comprises a component to adjustably set a maximum allowable flow rate above which the alarm is triggered and above which the flow is shut off. The component can be a conventional analogue or digital input such as a dial or a digital input for adjustably setting the maximum allowable flow rate.

The means for shutting off the flow in a water line to which the flow sentinel is connected is typically a solenoid that is energized when the flow sentinel detects an abnormally high rate of flow in the water line. A solenoid, as is well known in the art, is a coil with a magnetic inner core that moves to activate a shutoff mechanism when a current is applied. However, other devices can be used to effect a shutoff when a current is applied and the current is triggered by an abnormally high rate of flow in the water line. Other means for shutting off the flow in the water line are known in the art.

Means for powering the water flow meter, the means for display and/or remote transmission of the flow rate of the water, the alarm, and the means for shutting off the flow in the water line to which the flow sentinel is connected are also well known in the art. The flow sentinel can be powered by line voltage (typically 110 volts or 220 volts), or, alternatively, can be powered by low voltage produced from line voltage by the use of a stepdown transformer, as is commonly used to power low voltage exterior lighting or sprinkler systems. In another alternative, the flow sentinel can be powered by battery power, such as a conventional 9-volt battery. If the flow sentinel is powered by line voltage or by low voltage produced by the use of a stepdown transformer, a backup battery can optionally also be used. If the flow sentinel is powered by battery power or by line voltage with a backup battery, the battery is typically present in a battery compartment in the flow sentinel. The battery compartment is accessed via a hinged door or panel or, alternatively, by a removable panel, as is common in electronic devices with battery power. Other arrangements for the positioning of the battery are possible and known in the art.

In one embodiment of the flow sentinel of the present invention, the flow sentinel derives at least part of the power to run it from a turbine placed between the water inlet and the water outlet of the device. The turbine is capable of generating a low voltage sufficient to power the flow sentinel. In some alternatives, the turbine is capable of recharging rechargeable batteries.

In one embodiment of the flow sentinel of the present invention, the flow sentinel has dial-in capability including a signal transceiver that gives the user control of the flow sentinel from any internet-enabled device such as an internet-enabled computer or another internet-enabled device such as a PDA or smartphone. The signal transceiver enables a remote user to turn the flow sentinel on or off if desired and to receive a report, including the flow rate, the existence or non-existence of any alarm condition, and whether or not the means for shutting off the flow in a water line to which the flow sentinel is connected is currently activated or has been activated at any previous time period, for example, within the last day, the last week, or the last month. The transceiver can include or can be connected with a memory unit to store previous data on flow rate, the existence or non-existence of any alarm condition, or whether the flow in the water line to which the flow sentinel has been connected has been shut off. In another alternative, the flow sentinel can communicate via a wireless transmission device to notify a homeowner, tenant, or business owner that a problem exists. This communication is assisted by software that allows a user to customize the response. In this alternative, the device can be programmed to contact a homeowner, tenant, or business owner at a desired location, such as a home or office, and then ring through to a cellphone, smartphone, or PDA. The programming interface is easy to use and is based on Windows®.

In one alternative, the flow sentinel has the capacity of verifying water meter readings and remotely sending verified water meter readings (indicating volume of water used over a defined time period, such as a calendar month), to a water service provider such as a utility company or municipal, county, or water district water service provider.

In another alternative, the flow sentinel can monitor and control moisture in soil outside a building such as a residence or business. In this alternative, the flow sentinel is connected to a network of sensors and electronically controlled valves, such that each sensor and electronically controlled valve controls the soil moisture in a defined area of the soil; the number of sensors and electronically controlled valves depends on the total area to be monitored. This ensures that the watering schedule of a large or small tract is optimized and overwatering or underwatering is avoided. Overwatering not only wastes water, but can damage plants and encourage the growth of mold. Underwatering can leave plants vulnerable to disease and pests. This mode can be designated "water for cause." In this mode, the flow sentinel can interface with a computer that will enable programming for the various regions that the user wants to control. The software installed in the computer can also enable the monitoring and adjustment of any other function of the flow sentinel.

In one alternative, the flow sentinel can have a manual override in the event that the flow sentinel becomes stuck in the closed position or otherwise malfunctions.

Typically, in a flow sentinel according to the present invention, the electronics, including any analogue to digital converter required to convert an analogue signal from the flow meter to a digital output, the controller for the solenoid, and circuitry required to activate the digital display, are included on a single printed circuit board, as is conventional in the art.

One embodiment of a flow sentinel according to the present invention, employing power from line voltage, is shown in FIG. 1 as a perspective view from the front. The flow sentinel 10 has a watertight case 12 having a first side 14 and a second side 16. A water inlet 18 is positioned in the first side 14 of the watertight case 12. A water outlet 20 is positioned in the second side 16 of the watertight case 12. The watertight case 12 has control buttons 22, 24, and 26 to adjust parameters such as the minimum flow rate that signals an alarm condition, the means for remote transmission of flow rate, and other operating variables of the flow sentinel 10. The watertight case 12 also has a display panel 28 that can display, for example, the status 30 of the flow sentinel 10, the flow rate 32, and an alert message 34. (These displays are examples and other specific information can be displayed in the display panel 28). Attached to the watertight case 12 is an antenna 36 that can provide wireless transmission as described above, i.e., to the user or to a utility company or other water service provider. In FIG. 1, the antenna 36 is shown attached to and protruding from the first side 14 of the watertight case 12, but other locations for the antenna 36 are equally possible. The flow sentinel 10 shown in FIG. 1 is powered by line voltage supplied by a power cord 38. In FIG. 1, the power cord 38 is shown attached to and protruding from the first side of the watertight case 12, but other locations for the power cord 38 are equally possible. The flow sentinel 10 shown in FIG. 1 also has a dataport 40 that has a wired connection such as an Ethernet connection or other connection known in the art. In FIG. 1, the dataport 40 is shown attached to and protruding from the first side 14 of the watertight case 12, but other locations for the position of the dataport 40 are equally possible.

Figure 2:
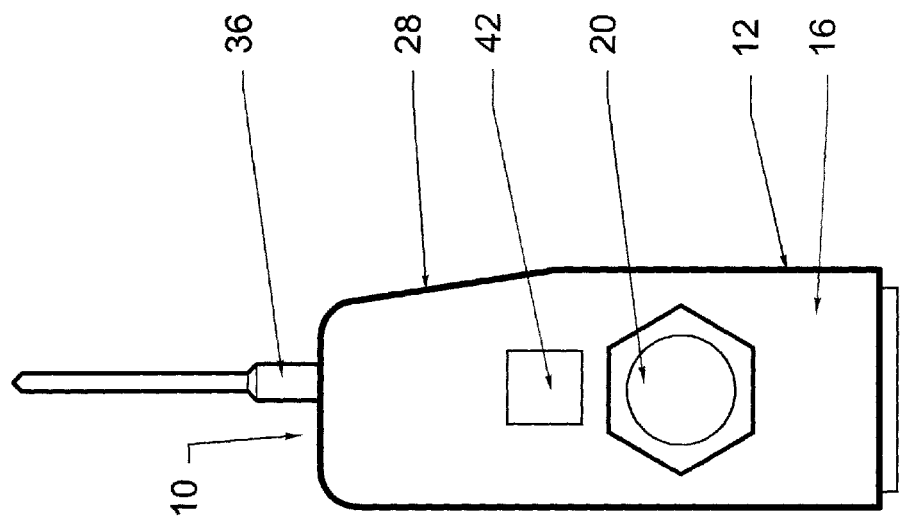
FIG. 2 is another perspective view from the second side of the watertight case of the flow sentinel shown in FIG. 1.

FIG. 2 is another perspective view of the flow sentinel 10 shown in FIG. 1 from the second side 16 of the watertight case 12. FIG. 2 shows the water inlet 18, the water outlet 20, the display panel 28, the antenna 36, and the power cord 38. FIG. 2 also shows a battery backup 42 located in the second side 16 of the watertight case 12. In FIG. 2, the battery backup 42 is shown in the second side 16 of the watertight case 12, but other positions for the battery backup 42 are equally possible.

Figure 3:
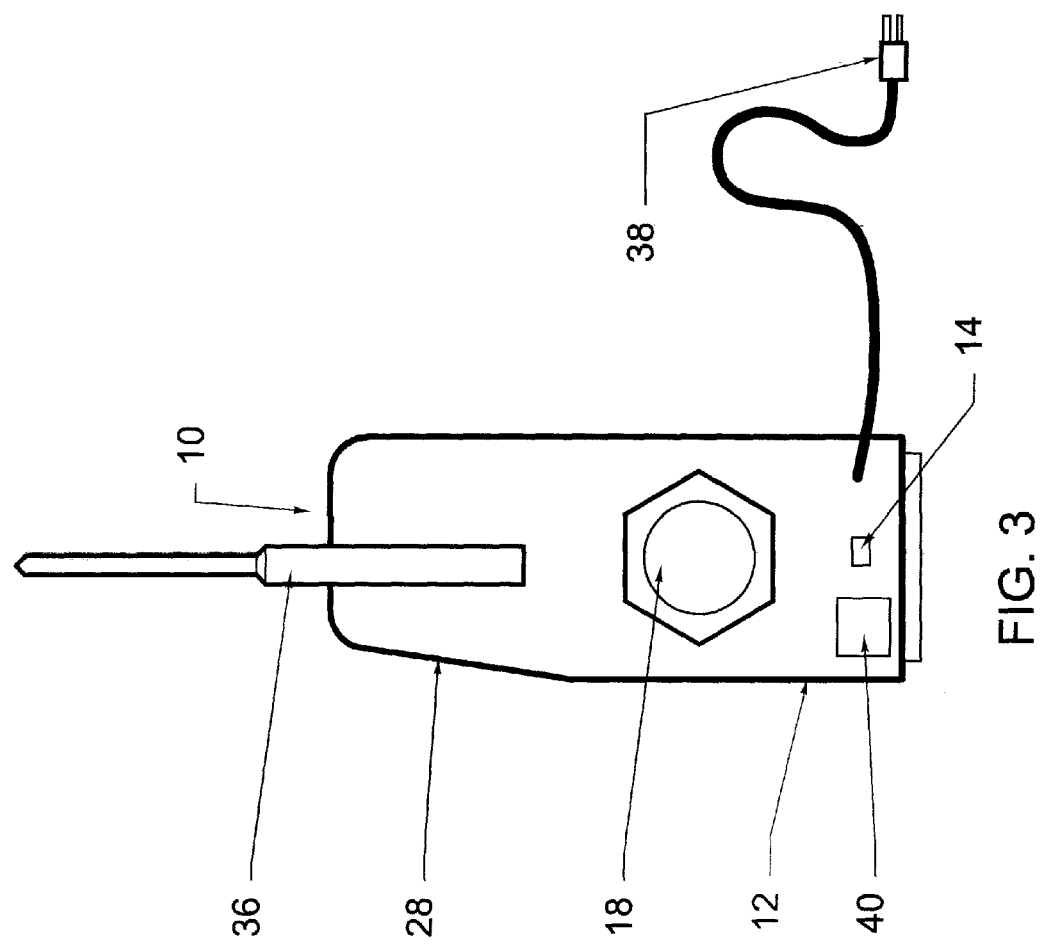
FIG. 3 is yet another perspective view of the flow sentinel shown in FIG. 1 from the first side of the watertight case.

FIG. 3 is yet another perspective view of the flow sentinel shown in FIG. 1 from the first side 14 of the watertight case 12. FIG. 3 shows the water inlet 18, the water outlet 20, the display panel 28, the antenna 36, the power cord 38, and the dataport 40.

Figure 4:
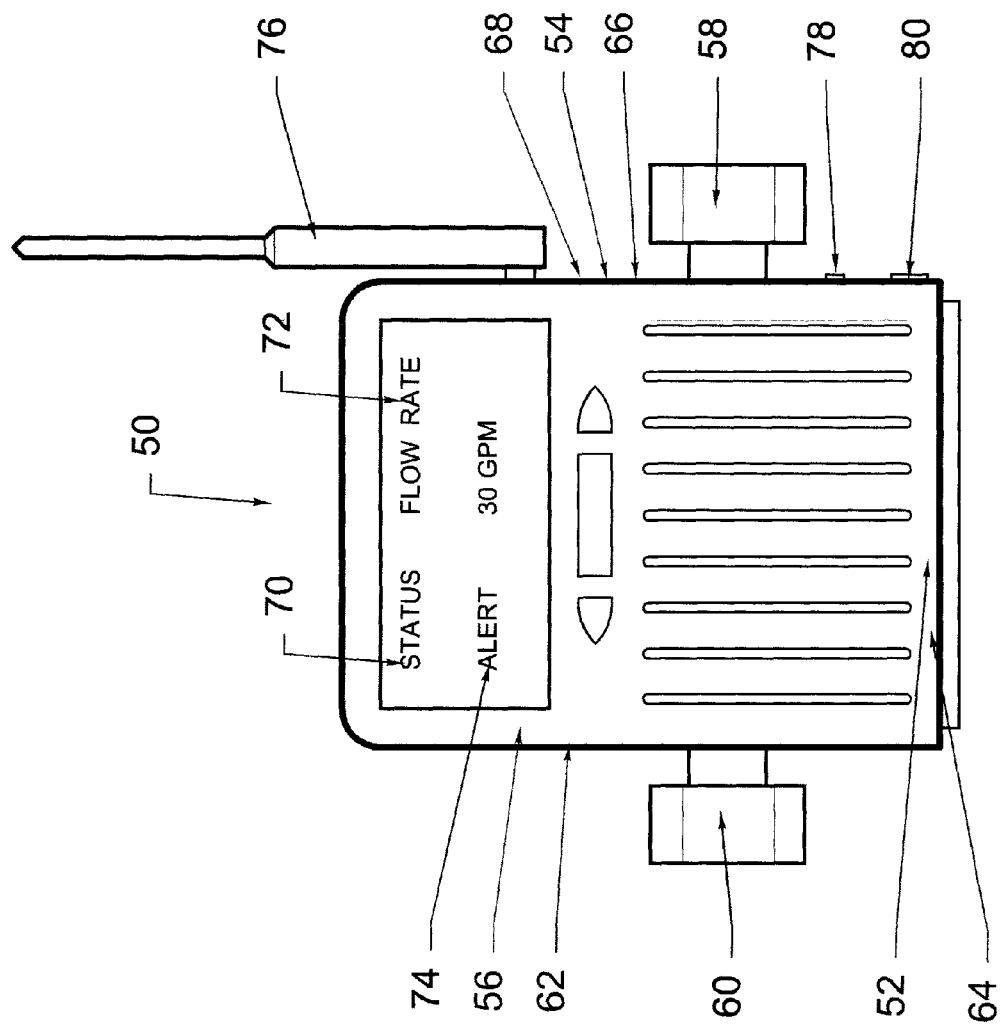
FIG. 4 is a perspective view from the front of another embodiment of the flow sentinel similar to that shown in FIG. 1 except that the flow sentinel is powered by low voltage power provided by an external stepdown transformer (not shown).

FIG. 4 is a perspective view from the front of another embodiment of the flow sentinel similar to that shown in FIG. 1 except that the flow sentinel is powered by low voltage power provided by an external stepdown transformer (not shown). The flow sentinel 50 has a watertight case 52 having a first side 54 and a second side 56. A water inlet 58 is positioned in the first side 54 of the watertight case 52. A water outlet 60 is positioned in the second side 56 of the watertight case 52. The watertight case 52 has control buttons 62, 64, and 66 to adjust parameters such as the minimum flow rate that signals an alarm condition, the means for remote transmission of flow rate, and other operating variables of the flow sentinel 50. The watertight case 52 also has a display panel 68 that can display, for example, the status 70 of the flow sentinel 50, the flow rate 72, and an alert message 74. (These displays are examples and other specific information can be displayed in the display panel 68). Attached to the watertight case 52 is an antenna 76 that can provide wireless transmission as described above, i.e., to the user or to a utility company or other water service provider. In FIG. 4, the antenna 36 is shown attached to and protruding from the first side 54 of the watertight case 52, but other locations for the antenna 76 are equally possible. The flow sentinel 50 shown in FIG. 4 is powered by low voltage produced by an external stepdown transformer supplied by a low voltage power jack 78. In FIG. 4, the low voltage power jack 78 is shown attached to and protruding from the first side of the watertight case 62, but other locations for the low voltage power jack are equally possible. The flow sentinel 50 shown in FIG. 4 also has a dataport 80 that has a wired connection such as an Ethernet connection or other connection known in the art. In FIG. 4, the dataport 80 is shown attached to and protruding from the first side 54 of the watertight case 52, but other locations for the position of the dataport 80 are equally possible.

Figure 5:
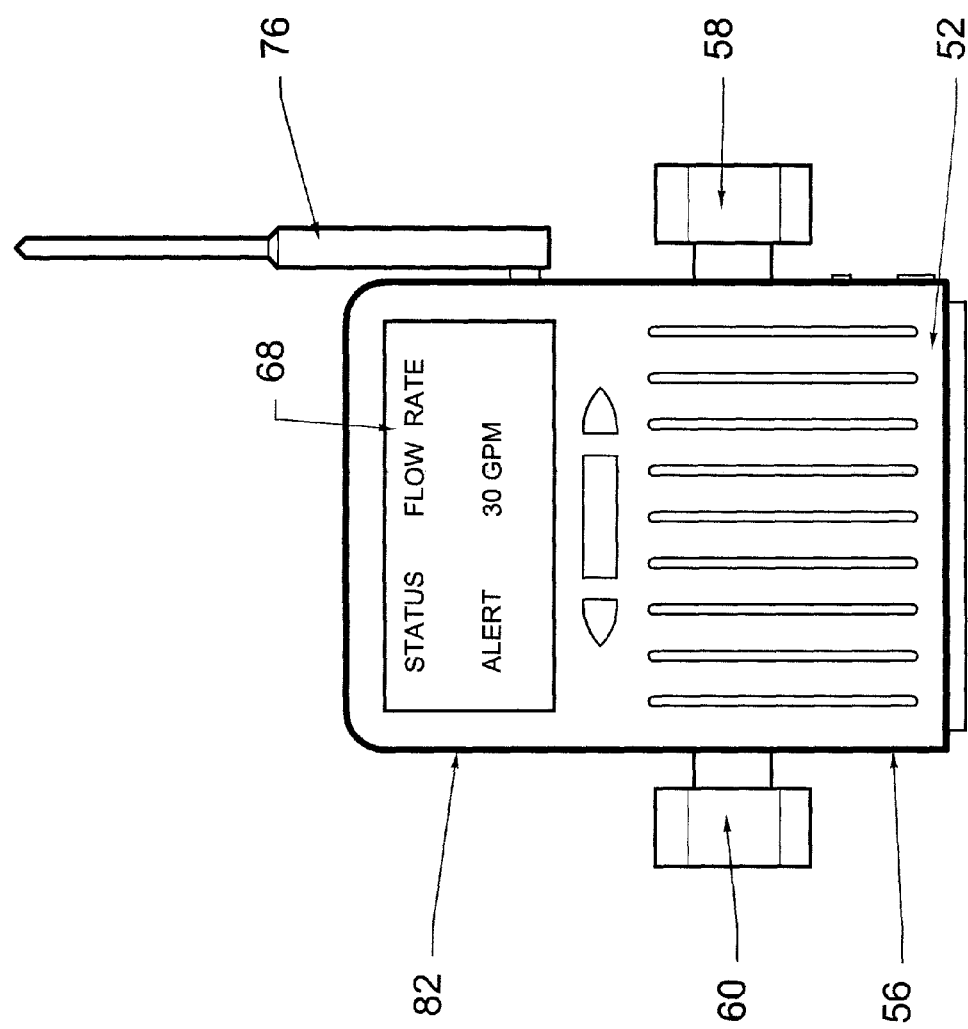
FIG. 5 is another perspective view of the flow sentinel shown in FIG. 4 from the second side of the watertight case.

FIG. 5 is another perspective view of the flow sentinel 50 shown in FIG. 4 from the second side 56 of the watertight case 52. FIG. 5 shows the water inlet 58, the water outlet 60, the display panel 68, and the antenna 76. FIG. 5 also shows a battery backup 82 located in the second side 56 of the watertight case 52. In FIG. 5, the battery backup 82 is shown in the second side 56 of the watertight case 52, but other positions for the battery backup 82 are equally possible.

Figure 6:
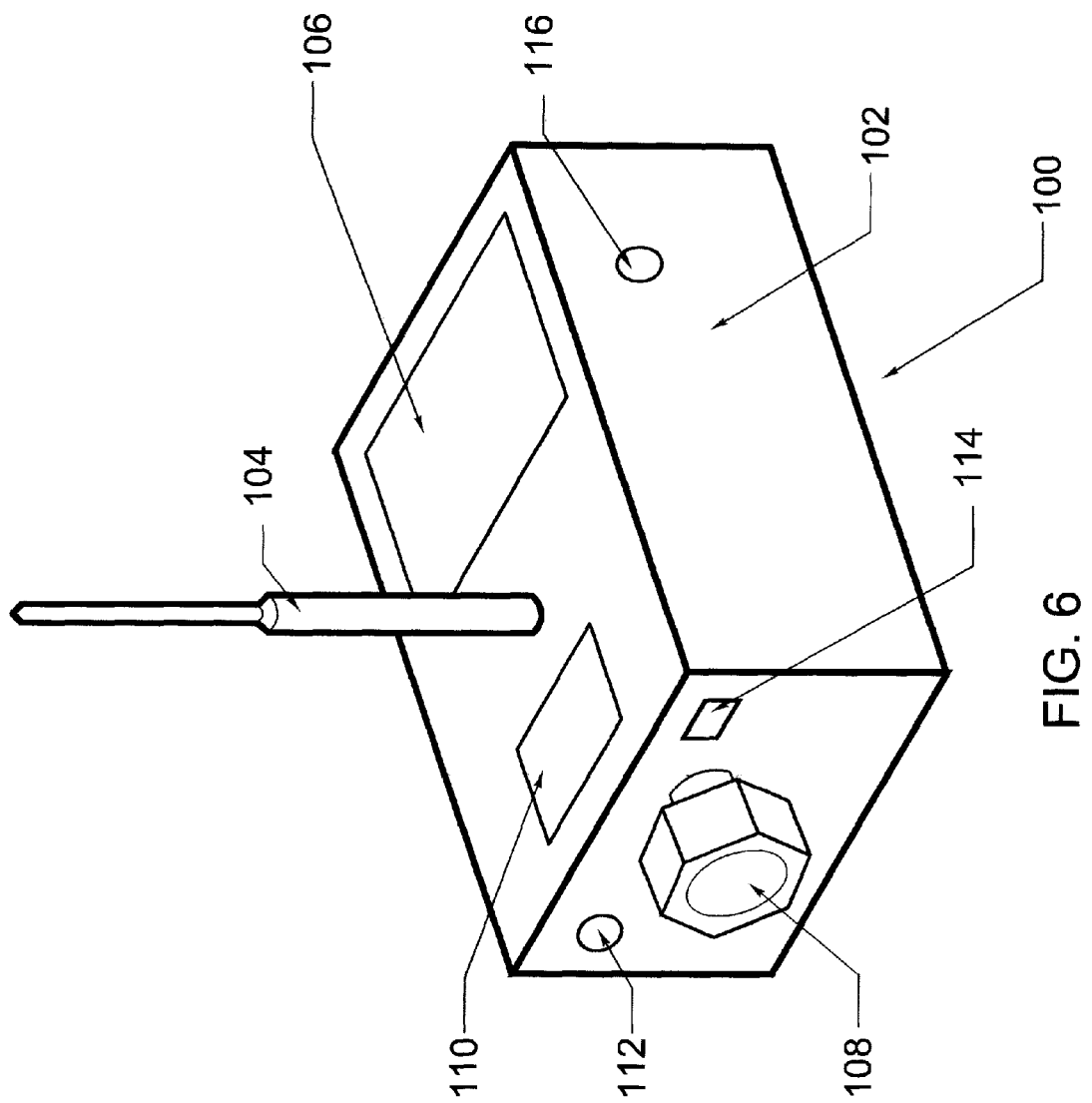
FIG. 6 shows a perspective view of another embodiment of a flow sentinel according to the present invention with a different arrangement of the flow sentinel.

FIG. 6 shows a perspective view of another embodiment of a flow sentinel according to the present invention with a different arrangement of the components of the flow sentinel. In FIG. 6, the flow sentinel 100 is depicted as a roughly boxlike cuboidal structure with six faces. The flow sentinel 100 has a watertight case 102. FIG. 6 shows an antenna 104, a digital display 106, a water inlet 108, the battery door 110, a connection for low voltage power 112, a dataport 114, and a control button 116; the control button 116 can be used to activate the digital display 106 with automatic fadeout of the digital display 106 after a preset time interval.

Figure 7:
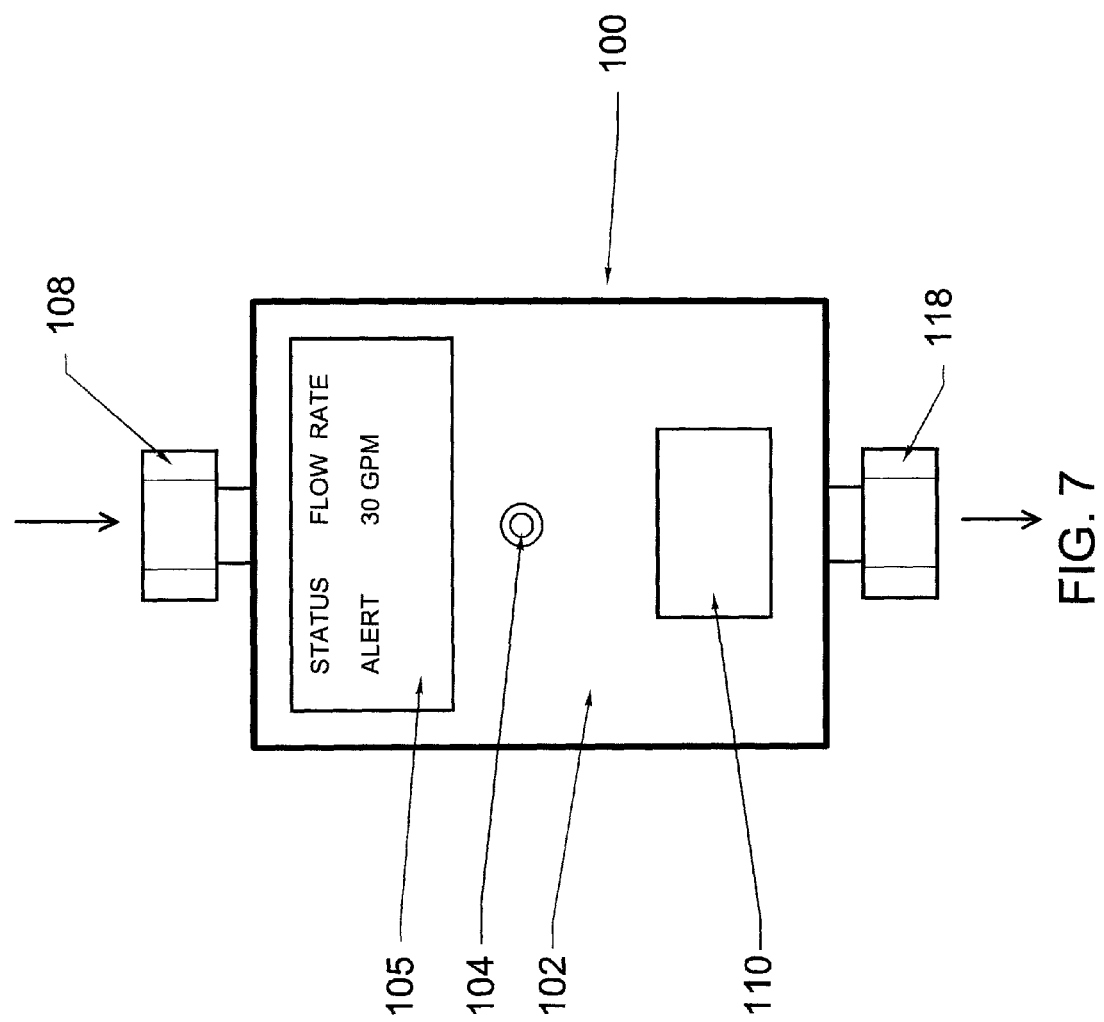
FIG. 7 is a top view of the embodiment of the flow sentinel shown in FIG. 6.

FIG. 7 is a top view of the embodiment of the flow sentinel 100 shown in FIG. 6. FIG. 7 shows the watertight case 102, the antenna 104, the digital display 106, the water inlet 108, the battery door 110, and the water outlet 118.

Figure 8:
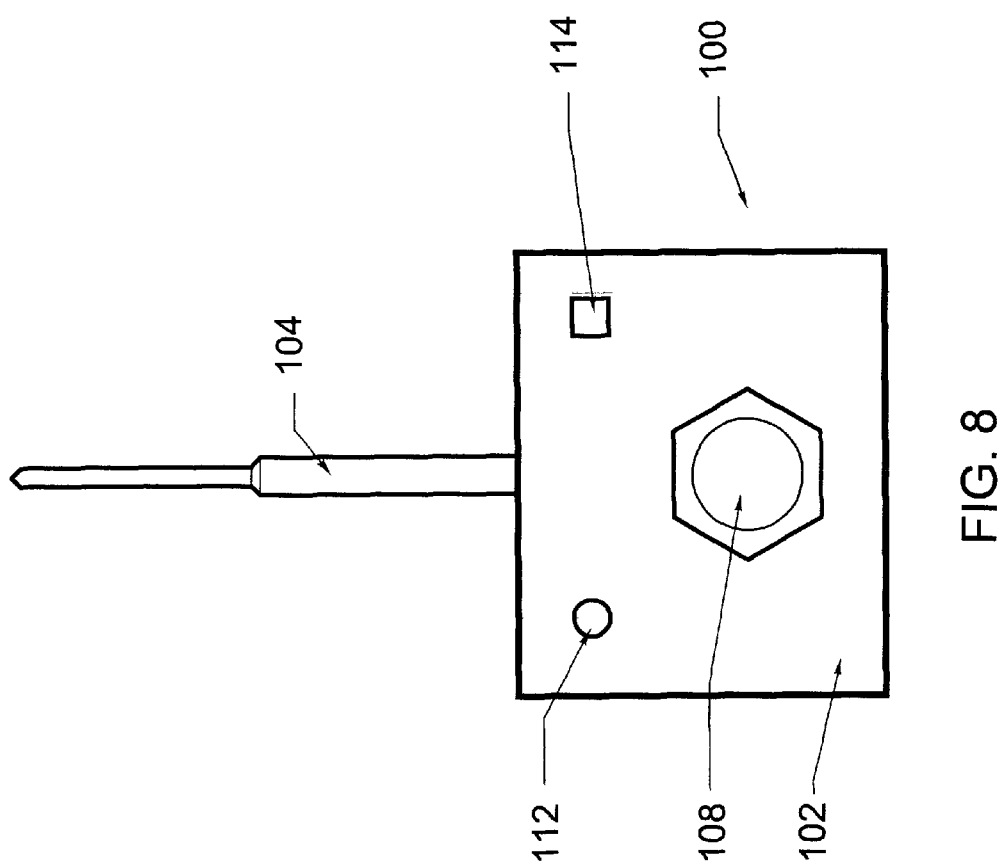
FIG. 8 is a side view of the embodiment of the flow sentinel shown in FIG. 6.

FIG. 8 is a side view of the embodiment of the flow sentinel 100 shown in FIG. 6. FIG. 8 shows the watertight case 102, the antenna 104, the water inlet 108, the connection for low voltage power 112, and the dataport 114.

Figure 9:
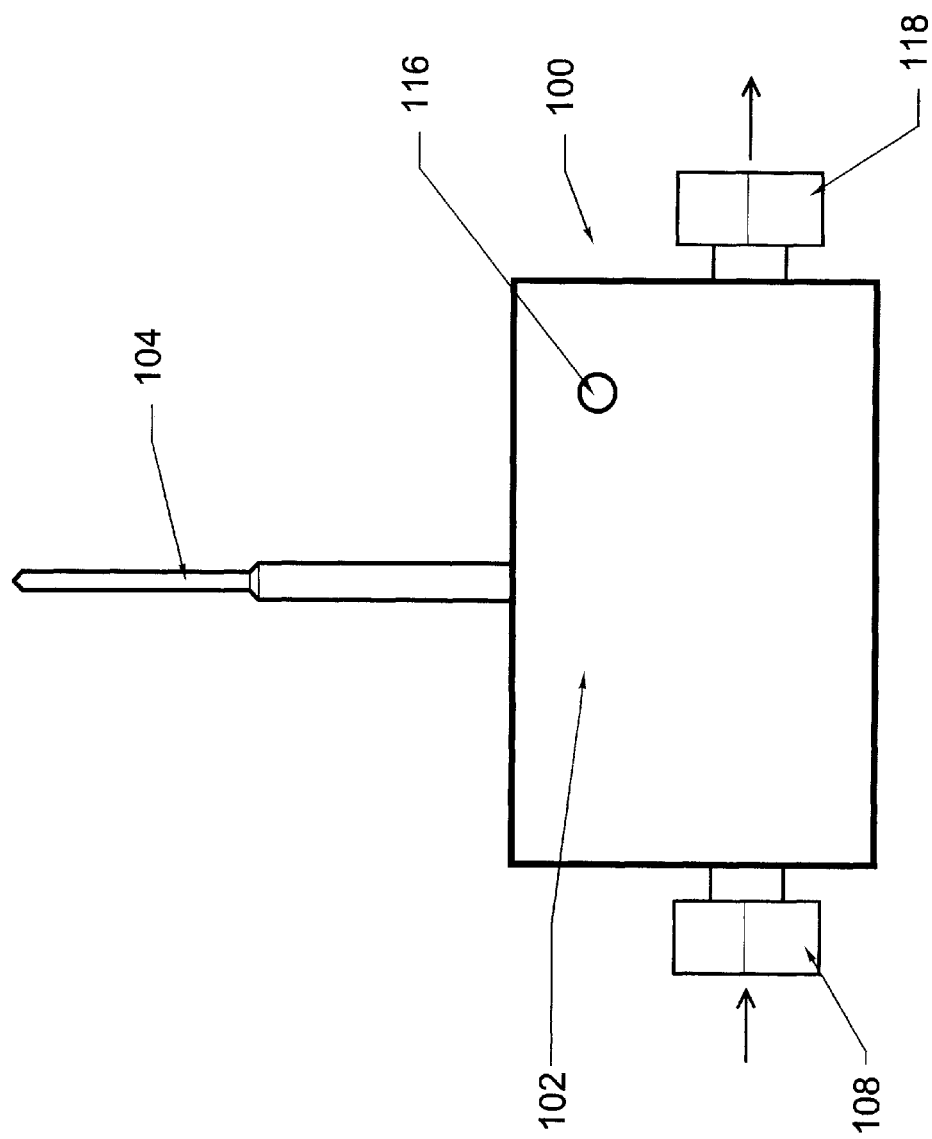
FIG. 9 is another side view of the embodiment of the flow sentinel shown in FIG. 6.

FIG. 9 is another side view of the embodiment of the flow sentinel 100 shown in FIG. 6. FIG. 9 shows the watertight case 102, the antenna 104, the water inlet 108, the control button 116, and the water outlet 118.

Figure 10:
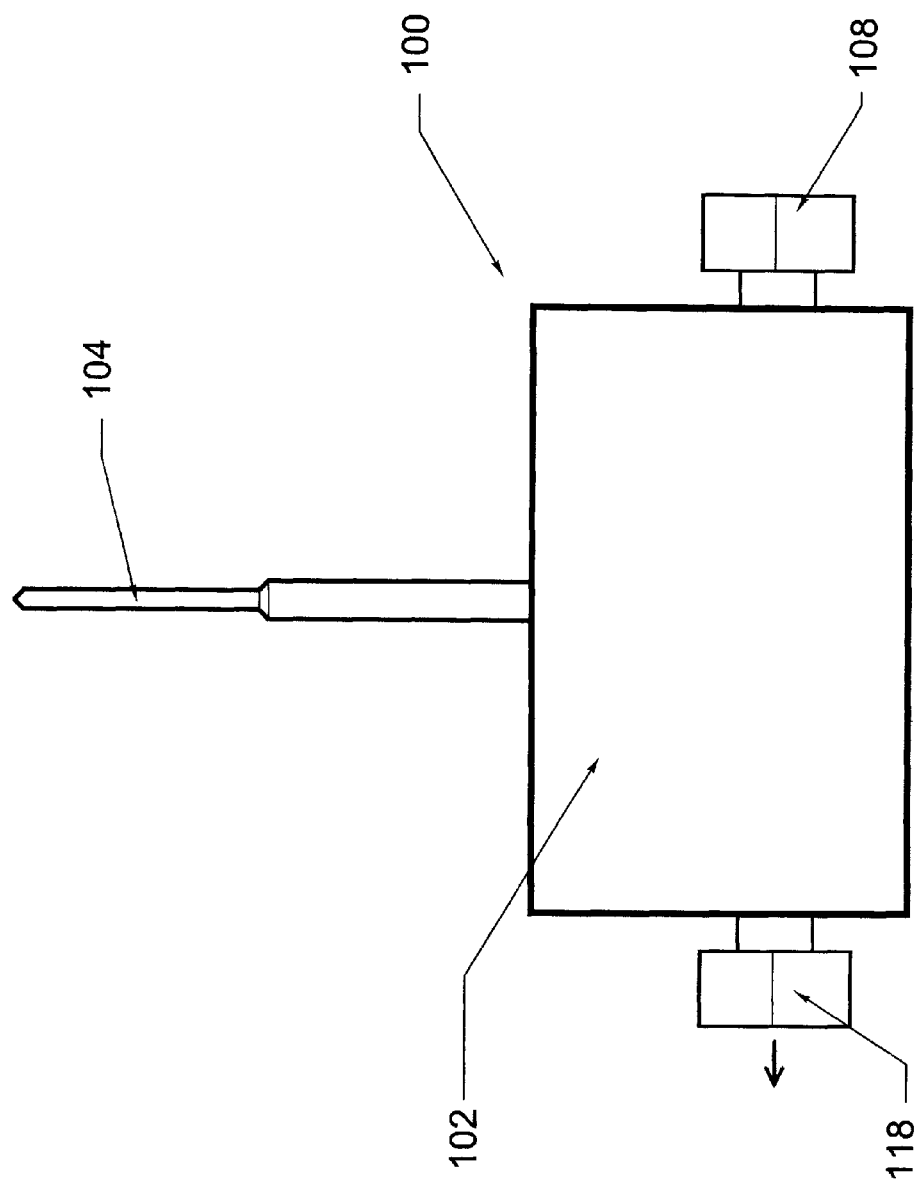
FIG. 10 is another side view of the embodiment of the flow sentinel shown in FIG. 6 from the opposite side of the view of FIG. 9.

FIG. 10 is another side view of the embodiment of the flow sentinel 100 shown in FIG. 6 from the opposite side of the view of FIG. 9. FIG. 10 shows the watertight case 102, the antenna 104, the water inlet 108, and the water outlet 118.

Figure 11:
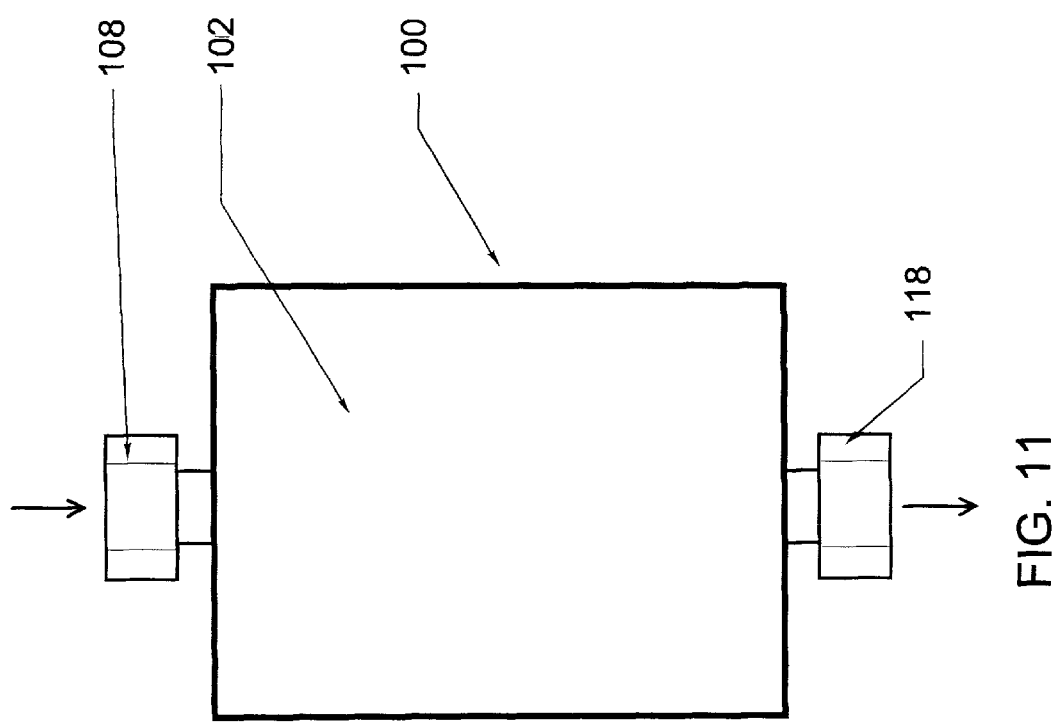
FIG. 11 is a bottom view of the embodiment of the flow sentinel shown in FIG. 6.

FIG. 11 is a bottom view of the embodiment of the flow sentinel 100 shown in FIG. 4. FIG. 11 shows the watertight case 102, the water inlet 108, and the water outlet 118.

Figure 12:
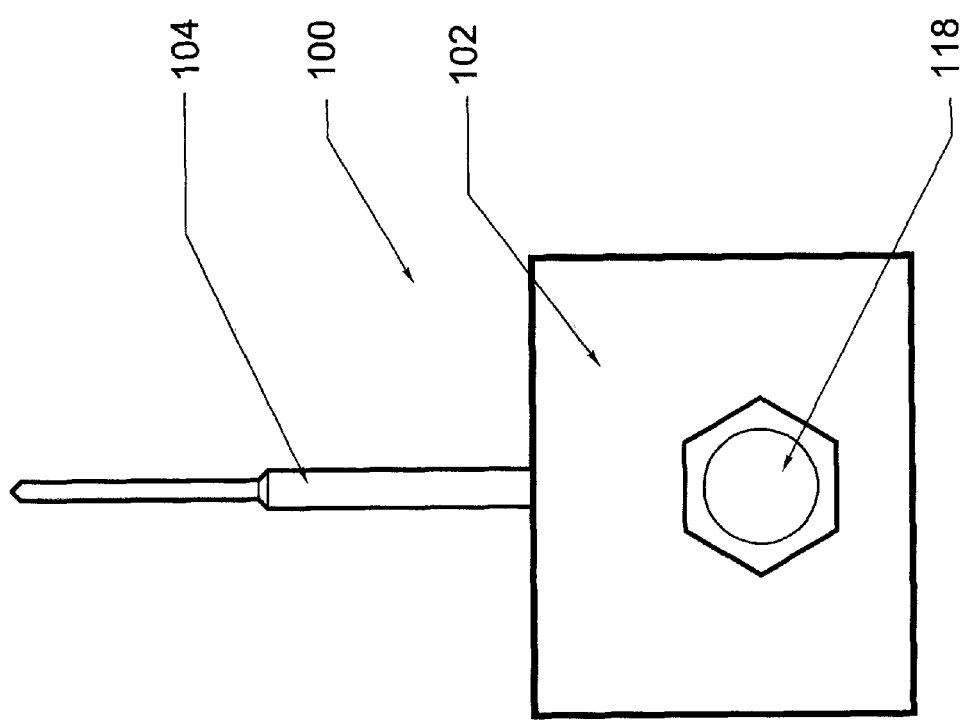
FIG. 12 is a side view of the embodiment of the flow sentinel shown in FIG. 6 from the opposite side of the view of FIG. 8.

FIG. 12 is a side view of the embodiment of the flow sentinel 100 shown in FIG. 6 from the opposite side of the view of FIG. 8. FIG. 12 shows the watertight case 102, the antenna 104, and the water outlet 118.

ADVANTAGES OF THE INVENTION

The present invention provides a flow sentinel that can be easily connected to conventional water lines and can be controlled remotely. The flow sentinel of the present invention prevents floods and consequent damage by shutting off the water in the water line in response to excessive flow or another abnormal condition. The flow sentinel can provide remote reports of the status of a water line to which the flow sentinel is connected to the user, as well as to the water service provider such as a utility company or municipal, county, or water district water service provider. The flow sentinel is reliable and uses little power; it is particularly useful for water lines that service buildings that are only occupied intermittently, avoiding a flood that otherwise may lead to water damage that is not detected for an extended period of time.

The present invention possesses industrial applicability as an article of manufacture that is useful in controlling the flow of water in water lines in homes and commercial buildings.

With respect to ranges of values, the invention encompasses each intervening value between the upper and lower limits of the range to at least a tenth of the lower limit's unit, unless the context clearly indicates otherwise. Moreover, the invention encompasses any other stated intervening values and ranges including either or both of the upper and lower limits of the range, unless specifically excluded from the stated range.

Unless defined otherwise, the meanings of all technical and scientific terms used herein are those commonly understood by one of ordinary skill in the art to which this invention belongs. One of ordinary skill in the art will also appreciate that any methods and materials similar or equivalent to those described herein can also be used to practice or test this invention.

The publications and patents discussed herein are provided solely for their disclosure prior to the filing date of the present application. Nothing herein is to be construed as an admission that the present invention is not entitled to antedate such publication by virtue of prior invention. Further the dates of publication provided may be different from the actual publication dates which may need to be independently confirmed.

All the publications cited are incorporated herein by reference in their entireties, including all published patents, patent applications, and literature references, as well as those publications that have been incorporated in those published documents. However, to the extent that any publication incorporated herein by reference refers to information to be published, applicants do not admit that any such information published after the filing date of this application to be prior art.

As used in this specification and in the appended claims, the singular forms include the plural forms. For example the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

What is claimed is:

1. A flow sentinel comprising:
    (a) a watertight case having a first side and a second side oppositely placed;
    (b) a water inlet positioned in the first side of the watertight case, the water inlet being adapted for connection to a water line;
    (c) a water outlet positioned in the second side of the watertight case, the water outlet being adapted for connection to a water line;
    (d) a water flow meter in operable contact with the water inlet and the water outlet so that water flows into the water inlet, flows through the flow meter, and flows out the water outlet, the water flow meter providing a digital readout of the flow rate of the water;
    (e) a digital display for the digital readout of the flow rate of the water;
    (f) an antenna mounted on an outside of the flow sentinel for remote transmission of the flow rate of the water;
    (g) an alarm to provide an indication of a water leak or other abnormal or unsafe operating condition;
    (h) means for shutting off the flow in a water line to which the flow sentinel is connected; and
    (i) means for powering the water flow meter, the digital display, the remote transmission of the flow rate of the water, the alarm, and the means for shutting off the flow in the water line to which the flow sentinel is connected.

2. The flow sentinel of claim 1 wherein the water flow meter is a mechanical water flow meter.

3. The flow sentinel of claim 1 wherein the water flow meter is selected from the group consisting of a magnetic water flow meter and an ultrasonic water flow meter.

4. The flow sentinel of claim 1 wherein the water flow meter also measures pressure in the water line.

5. The flow sentinel of claim 1 wherein the digital display also displays the existence of an alarm condition.

6. The flow sentinel of claim 1 wherein the alarm provides a visible or audible indication of a leak or other abnormal or unsafe operating condition.

7. The flow sentinel of claim 1 wherein the means for shutting off the flow in a water line to which the flow sentinel is connected is a solenoid that is energized when the flow sentinel detects an abnormally high rate of flow in the water line.

8. The flow sentinel of claim 1 that is powered by line voltage, by low voltage produced by a stepdown transformer, or by battery power.

9. The flow sentinel of claim 8 that has backup battery power.

10. The flow sentinel of claim 1 further comprising a dataport for a wired internet connection.

11. The flow sentinel of claim 1 further comprising a turbine placed between the water inlet and the water outlet, wherein the flow sentinel derives at least part of the power to run it from the turbine.

12. The flow sentinel of claim 1 further comprising a signal transceiver to provide dial-in capability to provide a user control of the flow sentinel from an internet-enabled device.

13. The flow sentinel of claim 12 wherein the signal transceiver further comprises a memory unit to store data.

14. The flow sentinel of claim 1 wherein the flow sentinel verifies water meter readings and remotely sends verified water meter readings to a water service provider.

15. The flow sentinel of claim 1 wherein the flow sentinel communicates via a wireless transmission device to notify a homeowner, tenant, or business owner that a problem exists.

16. The flow sentinel of claim 15 wherein the flow sentinel is programmed to contact a homeowner, tenant, or business owner at a desired location, such as a home or office, and then ring through to a cellphone, smartphone, or PDA.

17. The flow sentinel of claim 1 wherein the flow sentinel monitors and controls moisture in soil outside a building.

18. The flow sentinel of claim 17 wherein the flow sentinel is connected to a network of sensors and electronically controlled valves, such that each sensor and electronically controlled valve controls the soil moisture in a defined area of the soil.

19. The flow sentinel of claim 1 further comprising a component to adjustably set a maximum allowable flow rate above which the alarm is triggered and above which the flow is shut off.

* * * * *